United States Patent
McNamee et al.

(10) Patent No.: US 12,282,460 B2
(45) Date of Patent: Apr. 22, 2025

(54) REPRESENTING CONTAINER IMAGES IN AN IMAGE REGISTRY

(71) Applicant: International Business Machines Corporation, Armonk, NY (US)

(72) Inventors: Francis McNamee, Newry (GB); Paula May Tomaszko, Belfast (GB); Andrew Jack Bell, Belfast (GB); Robert Kerr, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/188,081

(22) Filed: Mar. 22, 2023

(65) Prior Publication Data

US 2024/0086370 A1 Mar. 14, 2024

(30) Foreign Application Priority Data

Sep. 9, 2022 (GB) ...................... 2213224

(51) Int. Cl.
*G06F 16/00* (2019.01)
*G06F 16/16* (2019.01)
*G06F 16/174* (2019.01)

(52) U.S. Cl.
CPC ........ *G06F 16/1744* (2019.01); *G06F 16/164* (2019.01)

(58) Field of Classification Search
None
See application file for complete search history.

(56) References Cited

U.S. PATENT DOCUMENTS

| | | | |
|---|---|---|---|
| 10,303,657 B2 | 5/2019 | Huang |
| 10,379,841 B2 | 8/2019 | Wong |
| 10,908,887 B2 | 2/2021 | Bhat |
| 2014/0082613 A1 | 3/2014 | Kundu |
| 2018/0024850 A1 | 1/2018 | Caro Estevez |
| 2018/0144062 A1 | 5/2018 | Jan |
| 2018/0189122 A1 | 7/2018 | Jobi |
| 2018/0336021 A1 | 11/2018 | Scrivano |
| 2020/0142680 A1 | 5/2020 | Varadharajan Kannan |
| 2020/0159536 A1 | 5/2020 | Saidi |
| 2021/0042141 A1 | 2/2021 | De Marco |
| 2021/0232345 A1 | 7/2021 | Corrie |
| 2021/0390090 A1 | 12/2021 | Eberlein |
| 2022/0229804 A1 | 7/2022 | Wu |

OTHER PUBLICATIONS

Yu, "Container Image Migration Compression Method, Device, Device and Medium", Dec. 21, 2021, 13 pages. (Year: 2021).*

* cited by examiner

*Primary Examiner* — Bai D Vu
(74) *Attorney, Agent, or Firm* — Edward J. Wixted, III

(57) ABSTRACT

A computer-implemented method, system, and computer program product are provided. A processor defines and stores units of image data of a container image, where the units of image data are compressible. A processor represents the units as nodes in a dependency graph for a container image, including one or more nodes at a dependency level in the dependency graph.

18 Claims, 11 Drawing Sheets

REPRESENTING CONTAINER IMAGES IN AN IMAGE REGISTRY

BACKGROUND

The present invention relates to container images, and more specifically, to representing container images in an image registry.

Modern cloud-based applications are often deployed as a collection of microservices running in many containers. Containers are lightweight, isolated environments designed to run a single process. Containers launch quickly and impose little overhead on the application they host.

Container images are blueprints for containers and a single image can create many identical containers. These images are normally hosted in remote image registries. Container images, and containers themselves, may become large as they must include all the dependencies required by the software they host. This large file size has a negative impact on storage and performance.

Container images are currently represented as a sequential list of layers. Layers are shareable, reusable fractions of a container image. Each layer describes a modification to be made to the resulting container. For example, an addition, a removal, or a modification of a file. Many container images in the registry share the same layers to reduce storage requirements and data transfer.

Currently layers are stored as a single compressed unit including all the data for the layer even when very large. The single layer unit is a single compressible unit with folders and files in a data hierarchy within the compressed unit. Changes in a layer can be detected but the specific changes themselves cannot be detected. Using the standard approach means even a small change to a single file within a layer will produce a completely new, near-identical layer with all the data duplication that entails.

A container image's total size is the sum of the sizes of the individual layers and each layer may contain thousands of files. If a single file in a layer is changed, the entire layer must be re-created and re-uploaded to the image registry. Users will then have to redownload the entire new layer. The existing layer must also be preserved by the registry because previous versions of the container image will still necessitate the old layer. In this scenario, the registry must store both copies of the layer.

SUMMARY

According to an aspect of the present invention there is provided a computer-implemented method for representing container images in an image registry, said method carried out by one or more processors of a computer system and comprising: defining and storing units of image data of a container image, wherein the units of image data are compressible; and representing the units as nodes in a dependency graph for a container image including one or more nodes at a dependency level in the dependency graph.

This has the advantage of facilitating data sharing between container images in an image registry, reducing data duplication and bandwidth usage in an image registry. The compressed units represented in the dependency graph are much smaller than conventional layers of a container image.

The units of image data may include references to other nodes defining the structure of folders within the image data.

The method may represent an individual unit as a node in a dependency graph of more than one container image in the image registry.

The method may include attaching metadata to a node in a dependency graph for a container image including conditional logic.

The method may include updating a compressed unit of a node for a container image.

The method may include providing container image data as container files and container folders; configuring one or more files and/or sub-folders of container folders as a unit that is compressible; and flattening each container folder into multiple compressed units. The one or more files and/or sub-folders may be configured as a unit with a size greater than a minimum configured size.

The method may include using a file-type specific extension to divide a file into multiple sub-files as units.

According to an aspect of the present invention there is provided a computer-implemented method for representing container images in an image registry including generating a container, said method carried out by one or more processors of a computer system and comprising: accessing a container image represented as a dependency graph with units of image data represented as nodes and with one or more nodes at a dependency level in the dependency graph; and constructing a container from the container image using a graph traversal including processing non-dependent nodes in parallel.

This has the advantage that the nodes of different branches of the dependency graph may be processed in parallel.

The units of image data may include references to other nodes defining the structure of folders within the image data; and the method including re-establishing a folder structure of image data when constructing a container from a container image.

The method may include using metadata attached to a node including conditional logic applied when traversing the graph.

According to another aspect of the present invention there is provided a container image for representing a container image in an image registry, comprising: a representation of individual units of image data as nodes in a dependency graph including one or more nodes at a dependency level in the dependency graph, wherein the individual units of image data are stored as compressed units in the image registry and referenced in the dependency graph.

The container image may include metadata attached to a node in the dependency graph including conditional logic.

The container image may include one or more updated nodes for updated stored compressed units.

According to another aspect of the present invention there is provided a system for representing container images in an image registry, comprising: a processor and a memory configured to provide computer program instructions to the processor to execute the function of the components: a compressed unit component for defining units of image data of a container image, wherein the units of image data are compressible; a compressed unit storage for storing compressed units; and a graph component for representing the units as nodes in a dependency graph for a container image including one or more nodes at a dependency level in the dependency graph.

The system may include a unit reference component for providing some of the units of image data as references to other nodes to define the structure of folders within the image data. The compressed unit storage may store individual compressed units that are represented in multiple container images in the image registry. The system may include a metadata component for attaching metadata to a node including conditional logic. The system may include an updating component for updating a compressed unit of a node for updating a container image.

The compressed unit component may include: an image data component for providing image data as container files and container folders; a configuring component for configuring one or more files and/or sub-folders as a unit that is compressible; and a folder flattening component for flattening each container folder into multiple compressed units.

The system may include a file-type extension component for using file-type specific extensions to divide a file into multiple sub-files as compressible units.

According to another aspect of the present invention there is provided a system for representing container images in an image registry, comprising: a processor and a memory configured to provide computer program instructions to the processor to execute the function of a container construction component for constructing a container from a container image including: a container image accessing component for accessing a container image represented as a dependency graph with units of image data represented as nodes and with one or more nodes at a dependency level in the dependency graph; and a container image traversing component for constructing a container from the container image using a graph traversal including processing non-dependent nodes in parallel.

The container construction component may include a metadata applying component for using metadata attached to a node including conditional logic applied when traversing the graph.

The container construction component may include an update applying component for receiving an update of a node individually and applying the update to the container image.

According to another aspect of the present invention there is provided a computer program product for representing container images in an image registry, the computer program product comprising a computer readable storage medium having program instructions embodied therewith, the program instructions executable by a processor to cause the processor to: define and store individual compressed units; and represent individual compressed units as nodes in a dependency graph as a container image including one or more nodes at a dependency level in the dependency graph.

According to another aspect of the present invention there is provided a computer program product for representing container images in an image registry, the computer program product comprising a computer readable storage medium having program instructions embodied therewith, the program instructions executable by a processor to cause the processor to: access a container image represented as a dependency graph with units of image data represented as nodes and with one or more nodes at a dependency level in the dependency graph; and construct a container from the container image using a graph traversal including processing non-dependent nodes in parallel.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for representing container images within a container registry and using the container images to generate containers. Representing image data within an image registry is provided with the image data of a container image broken up into small, compressed units and represented in a dependency graph. This enables increased sharing of common data between container images in the registry compared to traditional container images with layers.

This use of compressed units enables the container image to be represented as a dependency graph instead of a sequential list of layers. Each node in the graph represents a fraction of a layer from the existing approach. Therefore, one layer from the existing approach may become many nodes in the graph.

Building a container from the described form of container image may process the non-dependent parts of the container image in parallel. This results in container construction that can be faster since it does not have to be done sequentially.

Conditional logic may be encoded within the branches of the dependency graph of the container image. This may be useful for many reasons but especially when debugging microcontainers.

The described representation of container images is an improvement in the technical field of computer software generally and more particularly in the technical field of storage of container images. Using a more sophisticated data structure such as a dependency graph, rather than a sequential list, to represent data in container images enables optimization and additional application of algorithms. This will improve performance and increase efficiency.

Figure 1A:
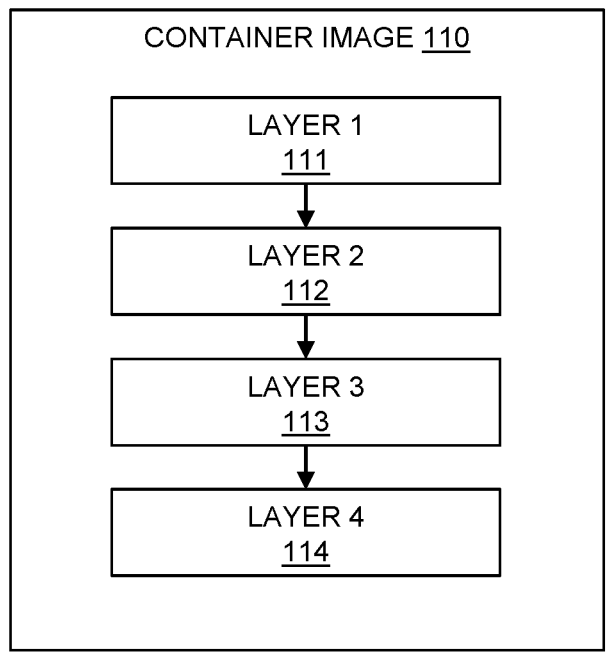
FIGS. 1A and 1B are schematic diagrams illustrating a container image and a layer of a container image.

Container images are currently represented as a sequential list of layers as shown in the schematic diagram 100 of FIG. 1A. A container image 110 is shown including four layers: Layer 1 111, Layer 2 112, Layer 3 113 and Layer 4 114. Layers are shareable, reusable fractions of a container image. Each layer describes a modification to be made to the resulting container. For example, an addition, a removal, or a modification of a file. Many container images in the registry share the same layers to reduce storage requirements and data transfer.

Figure 1B:
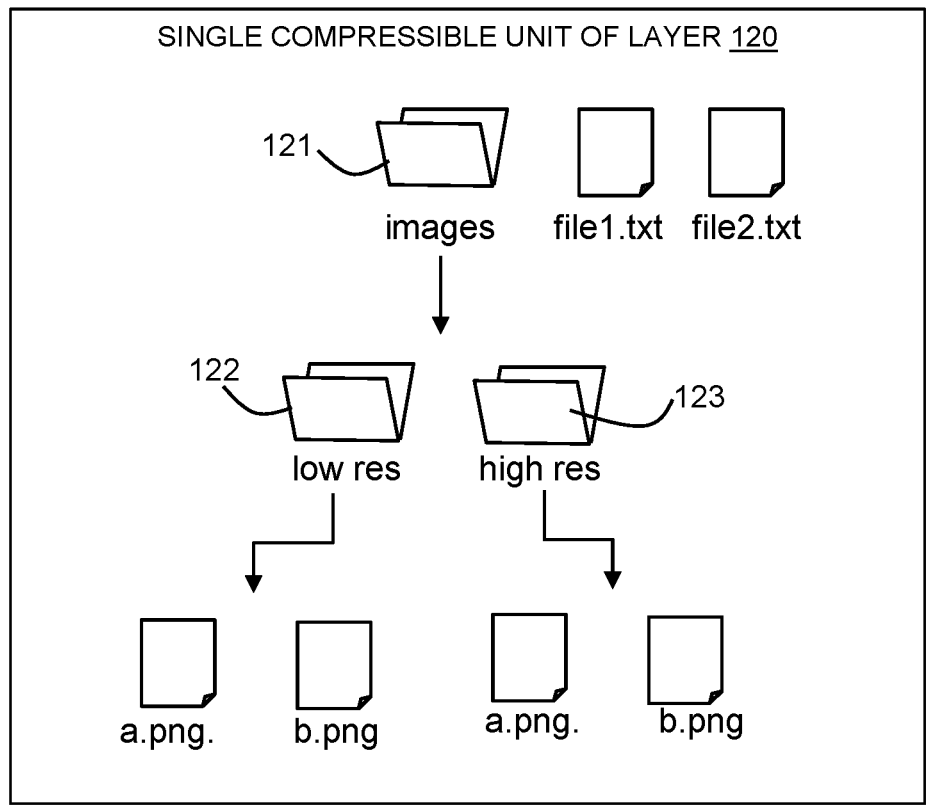

Currently, layers are stored as a single compressed unit 120 including all the data for the layer even when very large, as illustrated in FIG. 1B. The single layer unit 120 is shown as a single compressible unit with folders and files in a data hierarchy within the compressed unit. Changes in a layer can be detected, but the specific changes themselves cannot be detected. Using the standard approach means even a small change to a single file within a layer will produce a completely new, near-identical layer with all the data duplication that entails.

A container image's total size is the sum of the sizes of the individual layers and each layer may contain thousands of files. If a single file in layer 3 is changed, the entire layer must be re-created and re-uploaded to the image registry. Users will then have to redownload the entire new layer 3. The existing layer 3 must also be preserved by the registry because previous versions of the container image will still necessitate the old layer. In this scenario, the registry must store both copies of the layer.

Figure 2:
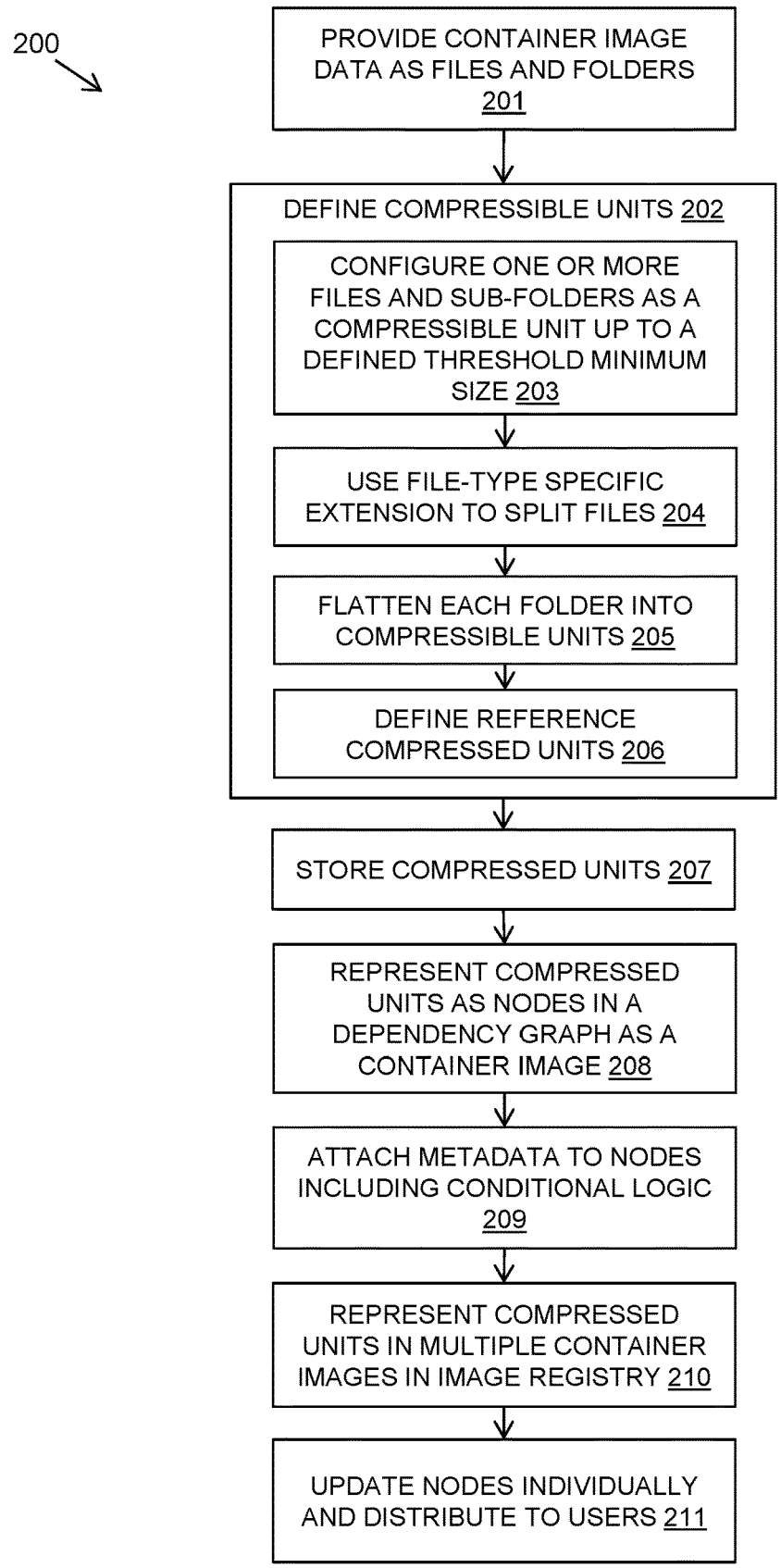
FIG. 2 is a flow diagram of an example embodiment of an aspect of a method in accordance with embodiments of the present invention.

Referring to FIG. 2, a flow diagram 200 shows an example embodiment of a computer-implemented method for representing container images in an image registry.

The method may provide 201 image data as files and folders that are to be used in a container image. The method may define units 202 in the form of small individual compressible units of files or sub-folders. A compressible unit may be as small as a single file. The method may configure 203 one or more files and/or sub-folders as a compressible unit with a size greater than a minimum configured size to limit the number of sub-folders to be flattened. Compressed unit parameters may be configured by an image registry operator.

The method may use 204 a file-type specific extension to divide a file into multiple sub-files as compressible units where they would otherwise be indivisible files.

The method may flatten 205 each folder into multiple compressible units. The method may define 206 some compressible units that are references to other compressed units which enables the original folder structure to be re-established when a container is built from a container image.

The method may store 207 the individual compressed units in the image registry.

The method may represent 208 the compressed units of the image data as a container image in the form of a dependency graph with individual compressed units represented as nodes in the dependency graph. The dependency graph includes one or more nodes at a dependency level in the dependency graph. The dependency graph is not simply a set of dependency layers as it includes possible branches in a level of the graph.

The method may attach 209 metadata to a node in a dependency graph including conditional logic.

The method may include individual compressed units as a node being represented 210 in multiple container images in the image registry.

The method may update 211 a compressed unit of a node for a container image.

Figure 3:
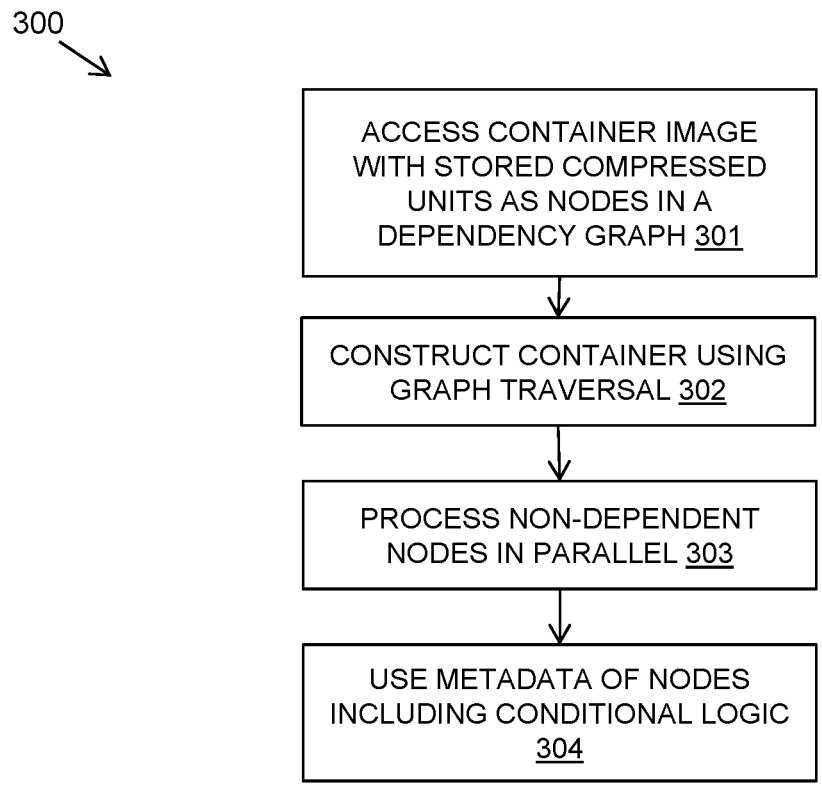
FIG. 3 is a flow diagram of an example embodiment of another aspect of a method in accordance with embodiments of the present invention.

Referring to FIG. 3, a flow diagram 300 shows an example embodiment of a computer-implemented method for representing container images in an image registry and using the container images to construct containers.

The method may access 301 a container image represented as a dependency graph with individual compressed units of image data represented as nodes and with one or more nodes at a dependency level in the dependency graph.

The method may construct 302 a container from the container image using a graph traversal including processing non-dependent nodes in parallel. This traversal may use the compressed units that are references to other compressed units to enable the original folder structure to be re-established.

The method may use 303 metadata attached to a node including conditional logic applied when traversing the graph.

The method may, at a later time, receive 304 an update of a node individually and may apply the update to the container image.

Figure 4A:
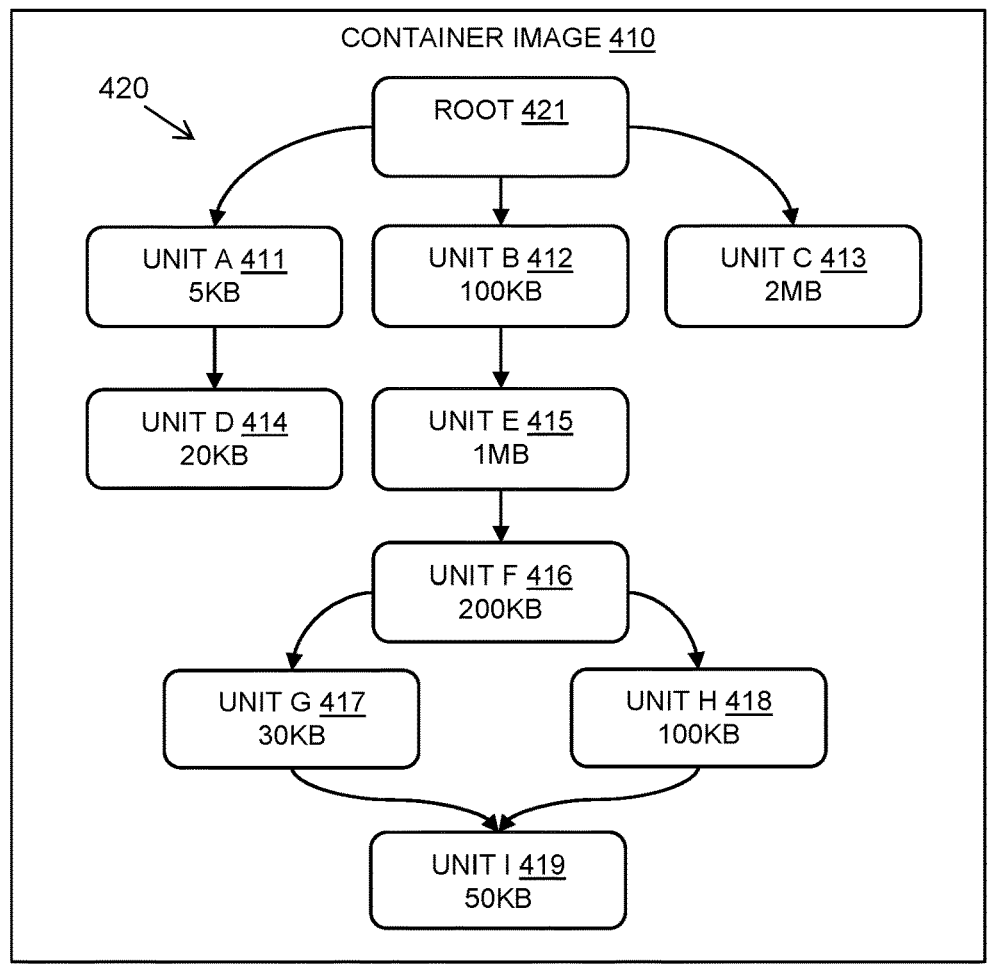
FIGS. 4A and 4B are schematic diagrams illustrating example embodiments of a container image and an image registry in accordance with aspects of the present invention.

Referring to FIG. 4A, a schematic diagram shows a container image 410 including a dependency graph (or tree) 420 including a root node 421 and nodes 411-419 representing compressed units of one or more files and/or sub-folders of container folders. The container image 410 includes one or more nodes 411-413 at a dependency level in the dependency graph 420. Instead of the traditional layers of a container image, the images are broken up into much smaller pieces and represented as a dependency graph or tree.

Figure 4B:
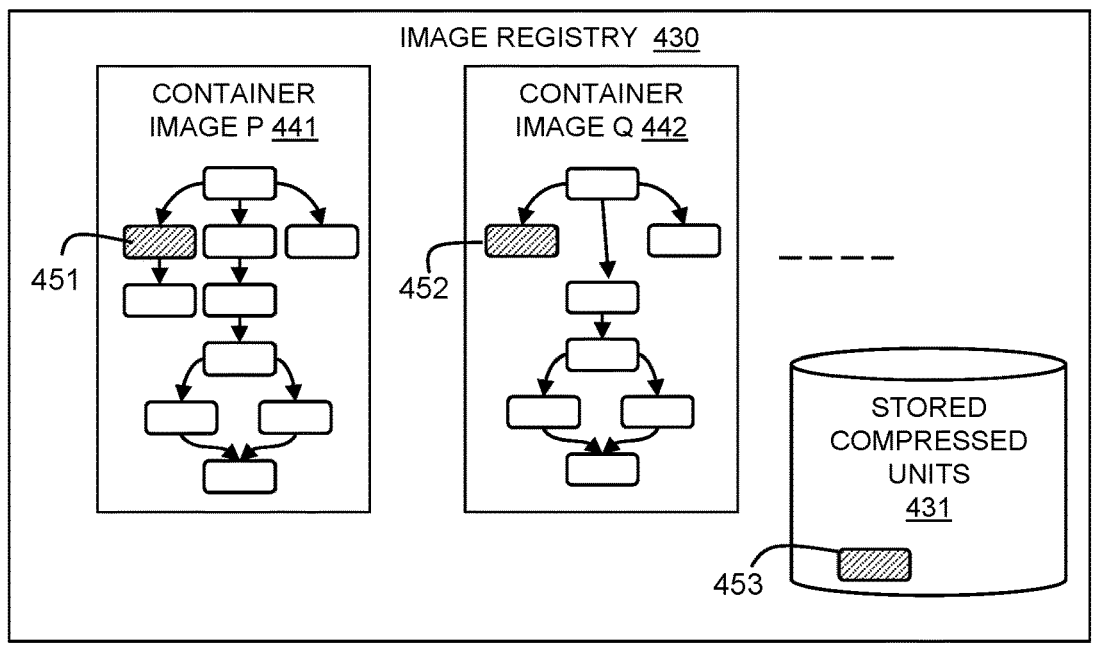

FIG. 4B shows an image registry 430 including stored compressed units 431 and multiple container images 441, 442 in the form of dependency graphs having nodes representing and referencing the stored compressed units 431.

In FIG. 4A, each node 411-419 in the graph 420 represents only a small number of files or even just a single file. This may be configurable by an image registry operator. Therefore, when a change is made, only those files which have been altered need to be stored in the image registry. This saves significant amounts of storage space and data transfer.

The described method stores files and folders from image data as individual compressed units. This enables significantly greater data sharing between separate container images. This is illustrated in FIG. 4B where a node 451 in container image P 441 represents the same compressed unit 453 of the stored compressed units 431 as the node 452 in container image Q 442. The degree of data sharing afforded by this approach has many efficiency benefits due to the smaller nature of the compressed units that are not possible using the traditional layers-based approach to container images in which the stored compressed units are entire layers.

The use of dependency graphs enables parallelism to be used to improve container creation performance. Traditionally, where container images are a sequential list of layers, each layer must be executed stepwise when building a container from an image. Dependency graphs traversal algorithms are known, and these are applied to the container image dependency graph when generating a container. Notably, there are algorithms that utilize multiple CPU cores simultaneously to traverse a graph in parallel.

When two or more nodes in a dependency graph are side-by-side, it is possible to execute those nodes simultaneously without interference. For example, nodes A 411, B 412 and C 413 in FIG. 4A can all be executed at once without interference. Once nodes A 411, B 412, and C 413 have completed, then nodes D 414 and E 415 can be executed together.

The branches in the dependency graph 420 lend themselves naturally to conditional logic. When building a container from a container image, parts of the dependency graph may be optionally ignored.

Figure 5A:
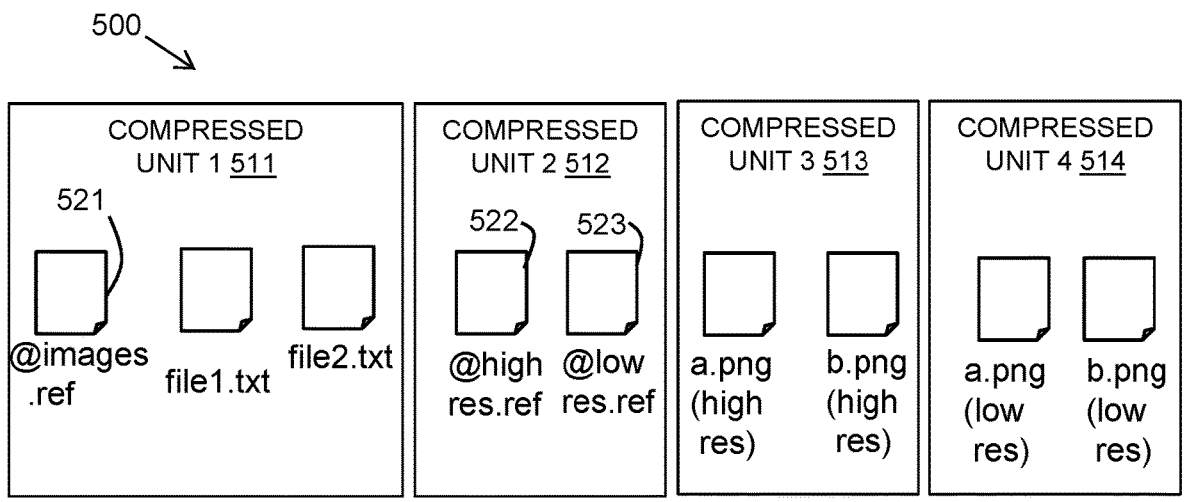
FIGS. 5A and 5B are schematic diagrams illustrating example embodiments of compressed units and a container image in accordance with aspects of the present invention.

Referring to FIG. 5A, a schematic diagram 500 shows an example embodiment with multiple compressible units 511-514. The illustrated compressible units 511-514 are based on the layer data of a folder shown in FIG. 1B. As the image data has greater granularity, it can be broken up into multiple compressible units that can reference each other. FIG. 5A shows the layer data after it has been flattened and their constituents stored as multiple compressed units 511-514.

The compressed units 511-514 may be as small as a single file and may include references in the form of very small files that replace large items of data (such as large files or folders) and which act as a placeholder for the large item. The files 521, 522, 523 shown with an "@" in FIG. 5A are references. References ensure that each compressed unit 511-514 is as small as possible. References are unique and reference only one compressed unit 511-514. The references are followed during image construction and the folders are reconstructed only when the container is created.

References minimize the necessary size of each compressed unit 511-514 and maximize the number of compressed units 511-514 that can be created from each image. The large number of minimally sized compressed units means images are likely to share many compressed units 511-514 which reduces data usage in the image registry.

Figure 5B:
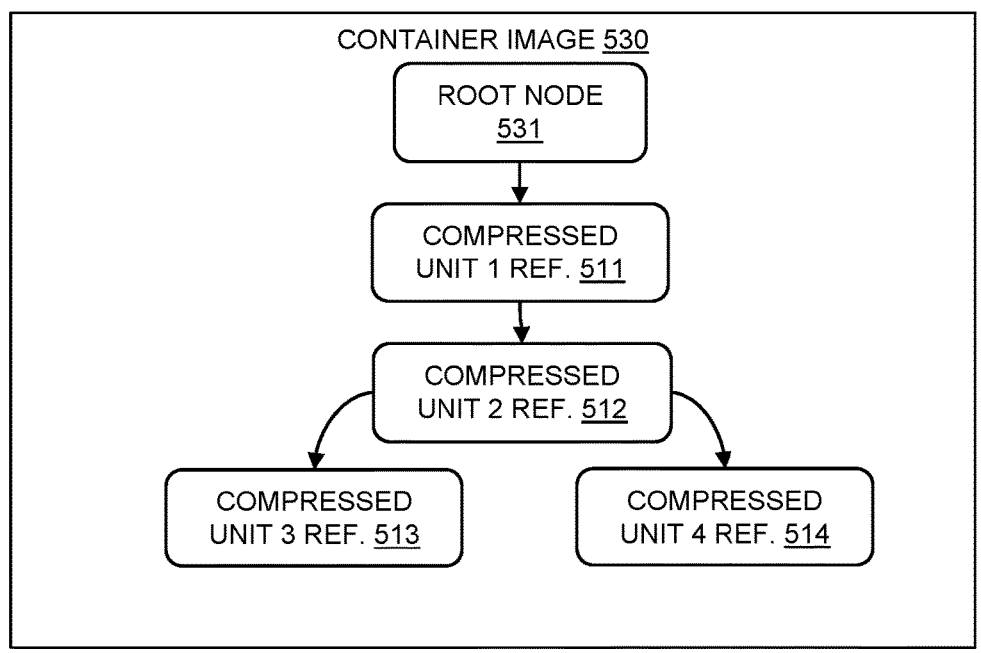

Each compressed unit 511-514 is referenced by a node in the dependency graph as shown in FIG. 5B. Folders and sub-folders within a compressed unit 511-514 may reference other compressed units. In this way, some of the compressed units are references to other compressed units which enables the original folder structure to be re-established when a container is built from a graph of a container image.

For example, the folder of images 121 of FIG. 1B becomes a reference 521 "@images.ref" in the compressed unit 1 511 of FIG. 5A and references and has a dependency of compressed unit 2 512. Similarly, sub-folders 122, 123 of high and low resolution images of FIG. 1B become references 522, 523 of "@high res.ref" and "@low res.ref" in compressed unit 2 of FIG. 5A. The reference 522 of "@high res.ref" references and has a dependency in the graph compressed unit 3 513 of the high resolution .png images.

The reference 523 of "@low res.ref" references and has as a dependency in the graph compressed unit 4 514 of the low resolution .png images.

In the traditional layer approach to a container image, if a container image needed file1.txt, for example, the image would need to download all of the layer shown in FIG. 1B. Using the described approach, file1.txt may be downloaded by downloading compressed unit 1 511 on its own. This increased granularity is what enables container images to be represented as a graph of many small nodes rather than a sequential list of large layers.

When individual compressed units 511-514 of data are defined and reference one another, this enables a dependency graph 530 as illustrated in FIG. 5B to be easily constructed using one of many well-known tree-construction algorithms.

A dependency graph 530 has a root node 531. If there is one compressed unit which all the others either directly or indirectly depend on, then this compressed unit would be the root of the tree. Otherwise, an empty node may be added automatically to the beginning of the tree to be used as the root node.

Figure 6:
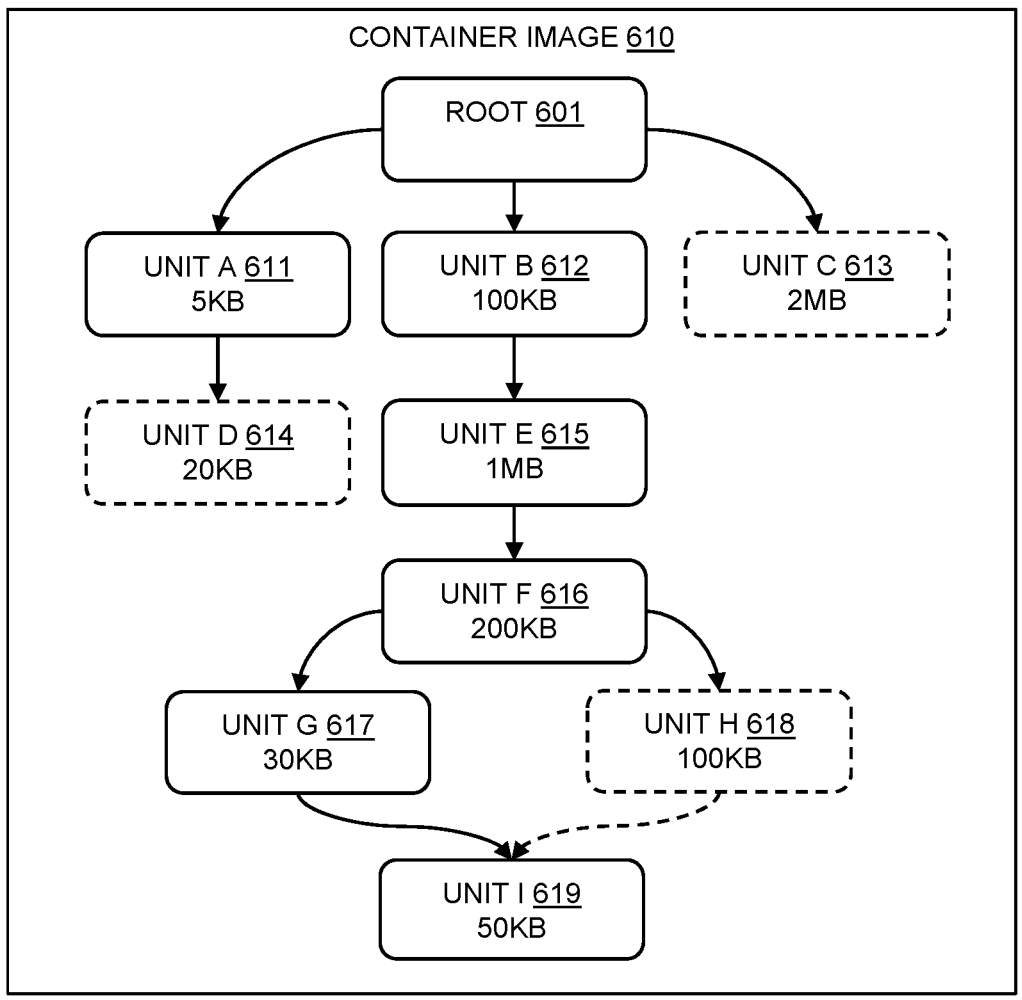
FIG. 6 is a schematic diagram illustrating another example embodiment of a container image illustrating conditional paths in accordance with aspects of the present invention.

Referring to FIG. 6, an example container image 610 has a dependency graph of nodes 601, 611-619 and illustrates optional parts of the dependency graph that are shown as nodes with dashed outlines 613, 614, 618.

Encoding conditional logic in the branches of the dependency graph enables a support engineer to build an identical image but to include support software only when required.

Enabling or disabling parts of the dependency graph can be easily done by attaching metadata to each node. For example, debug=true may be added to any node in the dependency graph. This would disable the node in question as well as all other nodes it directly or indirectly points to. The nodes 613, 618 and connections have been disabled and will not be processed.

During the execution shown in FIG. 6, several nodes 613, 614, 618 and their outgoing connections have been disabled. In this example, nodes C 613, D 614 and H 618 contain debugging data which may be optionally disabled.

Micro-containers are becoming popular due to their very small size. They achieve such small sizes because they remove much of the supporting software normally included within a container. This supporting software is often required for support engineers to debug issues in cloud services. Conditional logic in a container image enables a support engineer to build an identical image but to include support software only when required.

Figure 7:
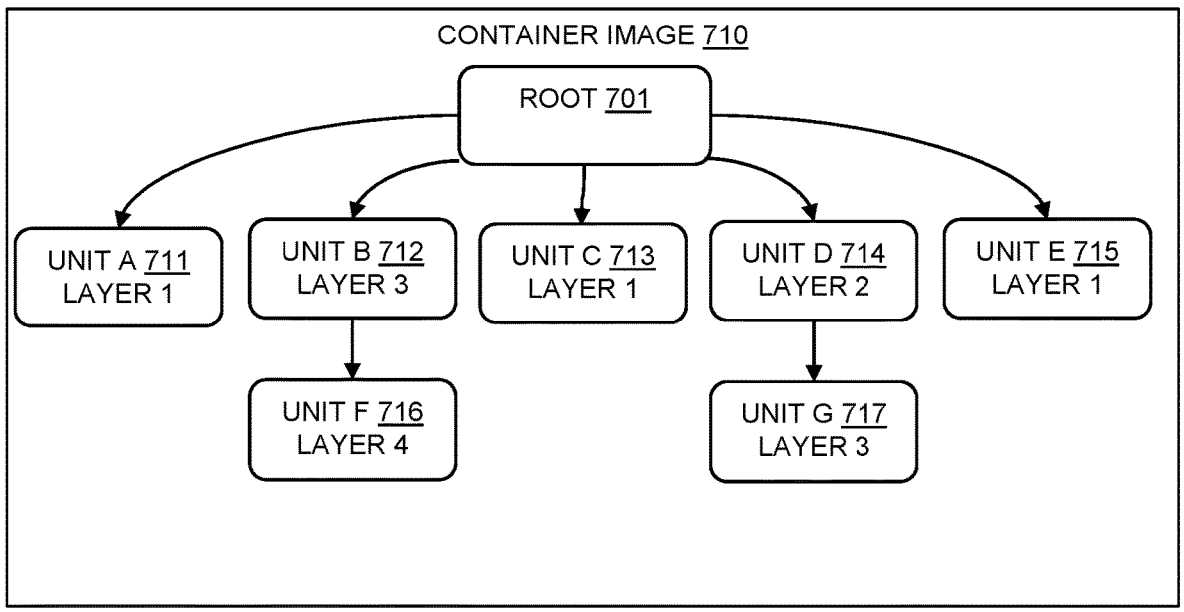
FIG. 7 is a schematic diagram illustrating another example embodiment of a container image illustrating parallel processing of units in accordance with aspects of the present invention.

Referring to FIG. 7, an example container image 710 has a dependency graph of nodes 701, 711-717 and illustrates how compressed units that contain files that would have been in different layers of a traditional contain image, may be processed in parallel, which speeds up container construction. For example, as unit B 712 includes data from layer 3 and is not dependent on any data in units that represent data of layer 1 or layer 2. Therefore, unit B 712 can be processed immediately in parallel with units A 711, C 713 and E 715 of layer 1 and unit D 714 of layer 2. Furthermore, unit F 716 of layer 4 that is dependent on unit B 712 can then be processed without delay.

Figure 8:
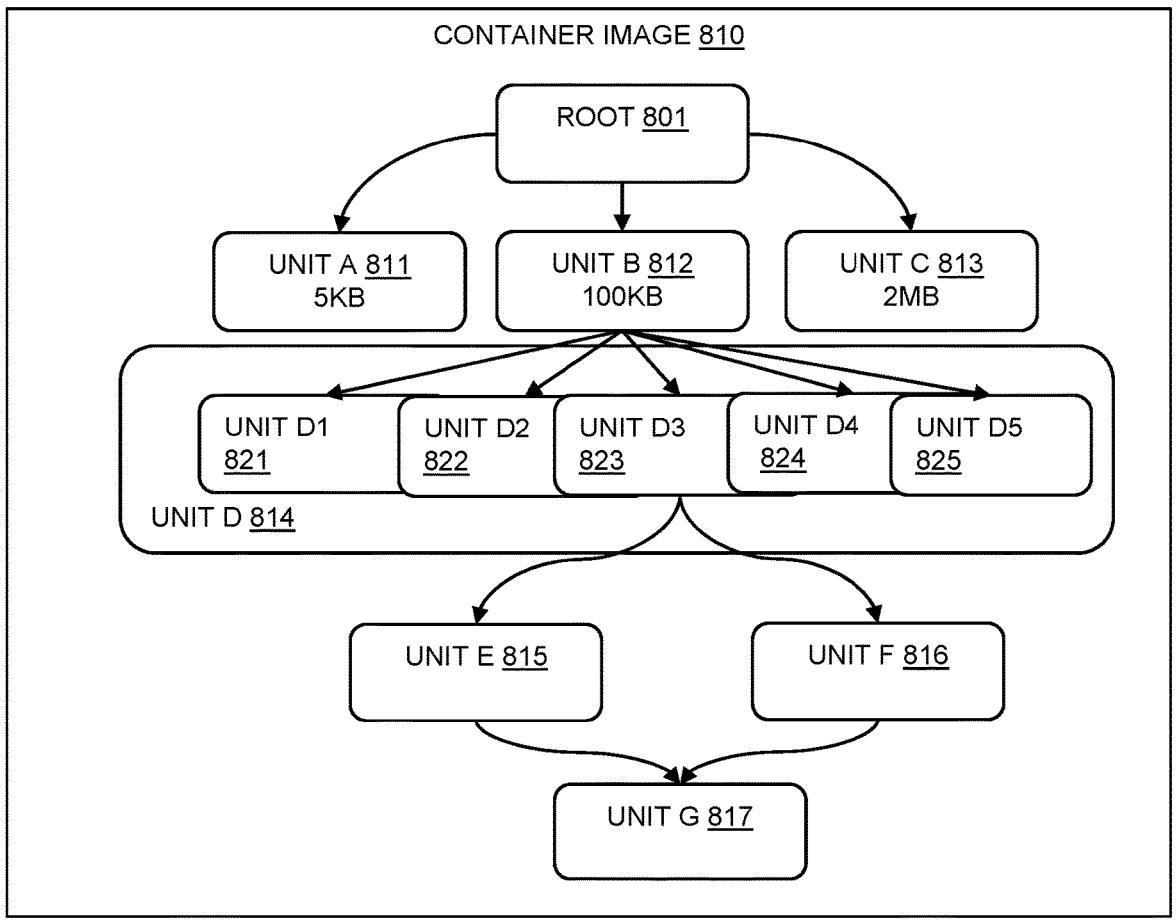
FIG. 8 is a schematic diagram illustrating another example embodiment of a container image illustrating a file-type extension in accordance with aspects of the present invention.

Referring to FIG. 8, an example container image 810 has a dependency graph of nodes 801, 811-817 and illustrates how a compressed unit (unit D 814) that is a large binary file may be partitioned into multiple compressed units (units D1 821, D2 822, D3 823, D4 824, D5 825).

If a large file cannot be split into compressible units by default, a file-specific extension may be added with each extension optionally enabled by an image registry operator. For example, this may include an extension for Java Archive (JAR) files, an extension for zip files, an extension for binary files, etc. Java and all Java-based trademarks and logos are trademarks or registered trademarks of Oracle and/or its affiliates.

For example, a JAR file is a zip file containing one type of file, a .class file. Instead of a compressed unit of a 10 MB JAR file, the JAR file may be partitioned into multiple compressible units. This is possible because the JAR extension has specific knowledge of how to partition JAR files. After applying the JAR extension, the JAR file becomes multiple compressible units, for example, 5×2 MB files. The same may be done for other large files using additional extensions.

Figure 9:
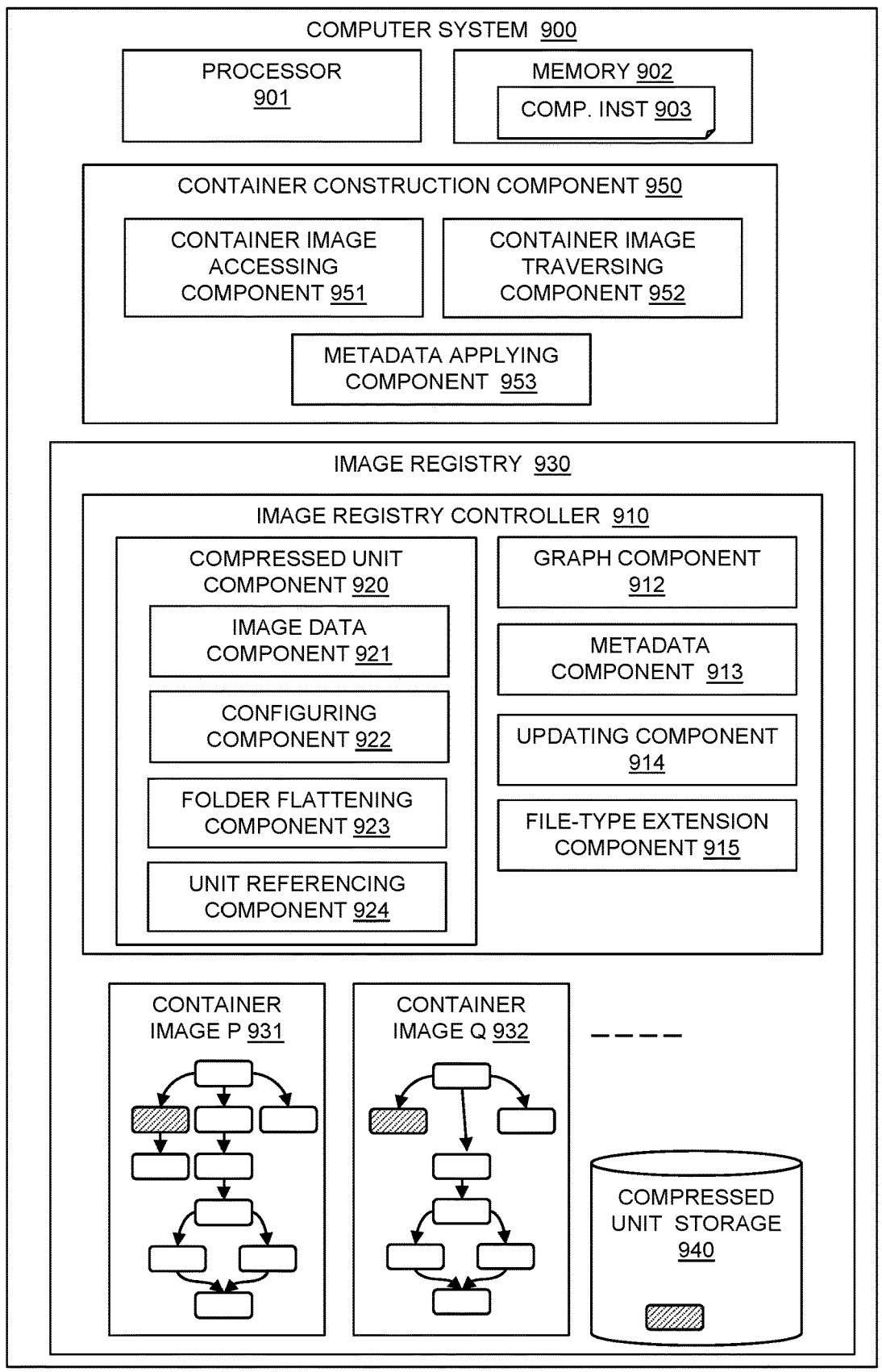
FIG. 9 is a block diagram of an example embodiment of a system in accordance with embodiments of the present invention.

Referring to FIG. 9, a block diagram shows an example embodiment of a computer system 900 including at least one processor 901, a hardware module, or a circuit for executing the functions of the described components which may be software units executing on the at least one processor. Multiple processors running parallel processing threads may be provided enabling parallel processing of some or all of the functions of the components. Memory 902 may be configured to provide computer instructions 903 to the at least one processor 901 to carry out the functionality of the components.

An image registry 930 may be run on the computer system 900 and may include an image registry controller 910 providing the functionality for representing container images within an image registry.

The image registry controller 910 may include a compressed unit component 920 for defining units of image data of a container image, where the units of image data are compressible. The image registry controller 910 may include a graph component 912 for representing the units as nodes in a dependency graph for a container image including one or more nodes at a dependency level in the dependency graph. The image registry 930 may include a compressed unit storage 940 for storing compressed units. The compressed unit storage 940 stores individual compressed units that are represented in multiple container images 931, 932 in the image registry 930.

The compressed unit component 920 may include: an image data component 921 for providing image data as container files and container folders; a configuring component 922 for configuring one or more files and/or sub-folders as a unit that is compressible; and a folder flattening component 923 for flattening each container folder into multiple compressed units. The compressed unit component 920 may include a unit reference component 924 for providing some of the units of image data as references to other nodes to define the structure of folders within the image data. Using these components, the compressed unit component 920 may represent image data for a container image as a dependency graph.

The image registry controller 910 may include a metadata component 913 for attaching metadata to a node including conditional logic.

The image registry controller 910 may include an updating component 914 for updating a compressed unit of a node for a container image.

The image registry controller 910 may include a file-type extension component 915 for using file-type specific extensions to divide a file into multiple sub-files as compressible units.

A container construction component 950 may be provided on the computer system 900 or another computer system for constructing a container from a container image in the image registry 930.

The container construction component 950 may include a container image accessing component 951 for accessing a container image represented as a dependency graph with units of image data represented as nodes and with one or more nodes at a dependency level in the dependency graph.

The container construction component 950 may include a container image traversing component 952 for constructing a container from the container image using a graph traversal including processing non-dependent nodes in parallel.

The container construction component 950 may include a metadata applying component 953 for using metadata attached to a node including conditional logic applied when traversing the graph.

Figure 10:
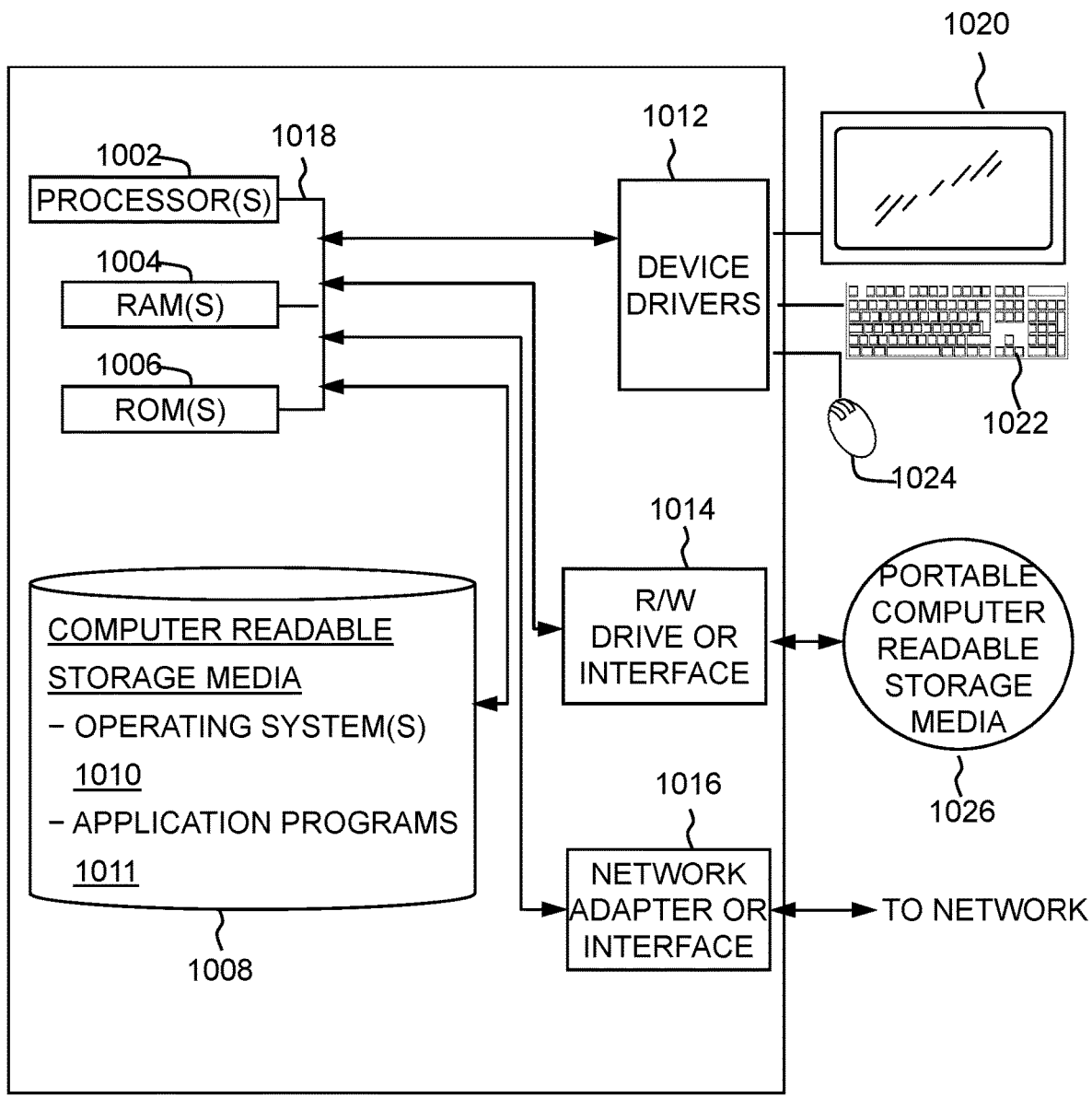
FIG. 10 is a block diagram of an embodiment of a computer system or cloud server in which embodiments of the present invention may be implemented.

FIG. 10 depicts a block diagram of components of a computing system 900, in accordance with an embodiment of the present invention. It should be appreciated that FIG. 10 provides only an illustration of one implementation and does not imply any limitations with regard to the environments in which different embodiments may be implemented. Many modifications to the depicted environment may be made.

The computing system can include one or more processors 1002, one or more computer-readable RAMs 1004, one or more computer-readable ROMs 1006, one or more computer readable storage media 1008, device drivers 1012, read/write drive or interface 1014, and network adapter or interface 1016, all interconnected over a communications fabric 1018. Communications fabric 1018 can be implemented with any architecture designed for passing data and/or control information between processors (such as microprocessors, communications and network processors, etc.), system memory, peripheral devices, and any other hardware components within the system.

One or more operating systems 1010 and application programs 1011, such as the image registry controller 910 and the container construction component 950 are stored on one or more of the computer readable storage media 1008 for execution by one or more of the processors 1002 via one or more of the respective RAMs 1004 (which typically include cache memory). In the illustrated embodiment, each of the computer readable storage media 1008 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 1014 to read from and write to one or more portable computer readable storage media 1026. Application programs 1011 on the computing system can be stored on one or more of the portable computer readable storage media 1026, read via the respective R/W drive or interface 1014 and loaded into the respective computer readable storage media 1008.

The computing system can also include a network adapter or interface 1016, such as a TCP/IP adapter card or wireless communication adapter. Application programs 1011 on the computing system can be downloaded to the computing device from an external computer or external storage device via a network (for example, the Internet, a local area network or other wide area networks or wireless networks) and network adapter or interface 1016. From the network adapter or interface 1016, the programs may be loaded into the computer readable storage media 1008. The network may comprise copper wires, optical fibers, wireless transmission, routers, firewalls, switches, gateway computers and edge servers.

The computing system can also include a display screen 1020, a keyboard or keypad 1022, and a computer mouse or touchpad 1024. Device drivers 1012 interface to display screen 1020 for imaging, to keyboard or keypad 1022, to computer mouse or touchpad 1024, and/or to display screen 1020 for pressure sensing of alphanumeric character entry and user selections. The device drivers 1012, R/W drive or interface 1014, and network adapter or interface 1016 can comprise hardware and software stored in computer readable storage media 1008 and/or ROM 1006.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
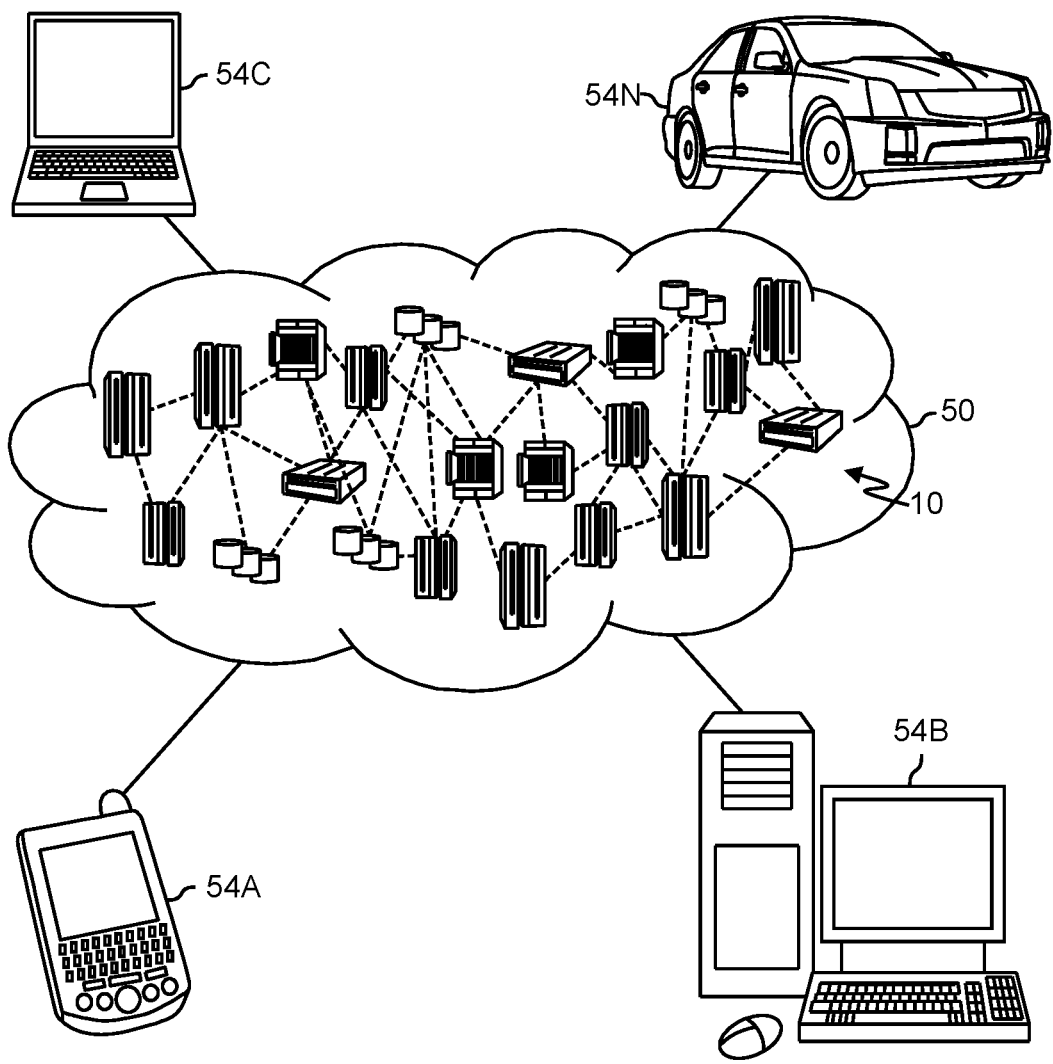
FIG. 11 is a schematic diagram of a cloud computing environment in which embodiments of the present invention may be implemented.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
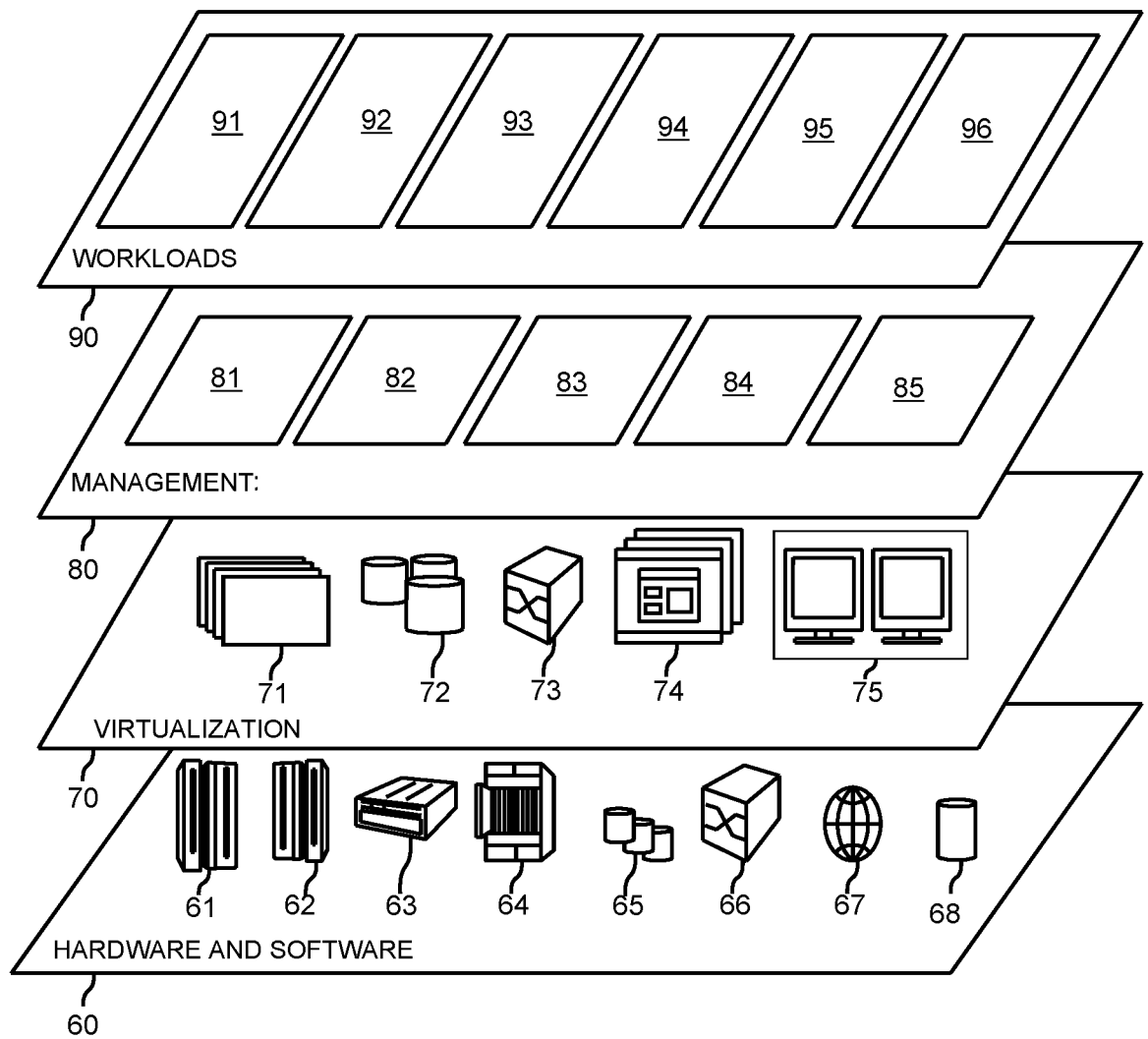
FIG. 12 is a diagram of abstraction model layers of a cloud computing environment in which embodiments of the present invention may be implemented.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
   receiving at least one file to be used in a container image;
   defining units of image data for a container image from the at least one file, wherein the units of image data are each independently compressible and each of a size greater than a minimum configured size;
   compressing the units of image data, wherein the container image comprises a combination of each of the compressed units of the image data;
   storing the compressed units of the image data in an image registry;
   representing, by one or more processors, each compressed unit of the image data as a node in a dependency graph for the container image, including one or more nodes at each dependency level in the dependency graph, wherein the dependency graph includes at least one branch at a dependency level;
   updating a compressed unit of a node of the nodes for the container image; and
   distributing the node to a user of the container image.

2. The computer-implemented method of claim 1, wherein the units of image data include references to other nodes defining a structure of folders within the image data.

3. The computer-implemented method of claim 1, further comprising representing an individual unit of the units as a node of the nodes in a second dependency graph of more than one container image in the image registry.

4. The computer-implemented method of claim 1, further comprising attaching metadata to a node of the nodes in the dependency graph for the container image, wherein the container image includes conditional logic.

5. The computer-implemented method of claim 1, further comprising:
   providing container image data as container files and container folders;
   configuring one or more files and sub-folders of the container folders as a unit, of the units, that is compressible; and
   flattening each container folder into multiple compressed units.

6. The computer-implemented method of claim 5, wherein the one or more sub-folders are configured as a unit with a size greater than the minimum configured size.

7. The computer-implemented method of claim 5, further comprising dividing, using a file-type specific extension, a file of the one or more files into multiple sub-files as units.

8. A computer program product comprising:
   one or more computer readable storage media, and program instructions collectively stored on the one or more computer readable storage media, the program instructions comprising:
   program instructions to receive at least one file to be used in a container image;
   program instructions to define units of image data for a container image from the at least one file, wherein the units of image data are each independently compressible and each of a size greater than a minimum configured size;

program instructions to compress the units of image data, wherein the container image comprises a combination of each of the compressed units of the image data;

program instructions to store the compressed units of the image data in an image registry;

program instructions to represent each compressed unit of the image data as a node in a dependency graph for the container image, including one or more nodes at each dependency level in the dependency graph, wherein the dependency graph includes at least one branch at a dependency level;

program instructions to update a compressed unit of a node of the nodes for the container image; and program instructions to distribute the node to a user of the container image.

9. The computer program product of claim 8, wherein the units of image data include references to other nodes defining a structure of folders within the image data.

10. The computer program product of claim 8, further comprising program instructions, collectively stored on the one or more computer readable storage media, to represent an individual unit of the units as a node of the nodes in a second dependency graph of more than one container image in the image registry.

11. The computer program product of claim 8, further comprising program instructions, collectively stored on the one or more computer readable storage media, to attach metadata to a node of the nodes in the dependency graph for the container image, wherein the container image includes conditional logic.

12. The computer program product of claim 8, further comprising:

program instructions, collectively stored on the one or more computer readable storage media, to provide container image data as container files and container folders;

program instructions, collectively stored on the one or more computer readable storage media, to configure one or more files and sub-folders of the container folders as a unit, of the units, that is compressible; and program instructions, collectively stored on the one or more computer readable storage media, to flatten each container folder into multiple compressed units.

13. The computer program product of claim 12, wherein the one or more sub-folders are configured as a unit with a size greater than the minimum configured size.

14. The computer program product of claim 12, further comprising program instructions, collectively stored on the one or more computer readable storage media, to divide using a file-type specific extension, a file of the one or more files into multiple sub-files as units.

15. A computer system comprising:

one or more computer processors, one or more computer readable storage media, and program instructions collectively stored on the one or more computer readable storage media for execution by at least one of the one or more computer processors, the program instructions comprising:

program instructions to receive at least one file to be used in a container image;

program instructions to define units of image data for a container image from the at least one file, wherein the units of image data are each independently compressible and each of a size greater than a minimum configured size;

program instructions to compress the units of image data, wherein the container image comprises a combination of each of the compressed units of the image data;

program instructions to store the compressed units of the image data in an image registry;

program instructions to represent each compressed unit of the image data as a node in a dependency graph for the container image, including one or more nodes at each dependency level in the dependency graph, wherein the dependency graph includes at least one branch at a dependency level;

program instructions to update a compressed unit of a node of the nodes for the container image; and program instructions to distribute the node to a user of the container image.

16. The computer system of claim 15, wherein the units of image data include references to other nodes defining a structure of folders within the image data.

17. The computer system of claim 15, further comprising program instructions, collectively stored on the one or more computer readable storage media for execution by at least one of the one or more computer processors, to represent an individual unit of the units as a node of the nodes in a second dependency graph of more than one container image in the image registry.

18. The computer system of claim 15, further comprising program instructions, collectively stored on the one or more computer readable storage media for execution by at least one of the one or more processors, to attach metadata to a node of the nodes in the dependency graph for the container image, wherein the container image includes conditional logic.

* * * * *